(12) United States Patent
Dickerson et al.

(10) Patent No.: US 11,160,261 B1
(45) Date of Patent: Nov. 2, 2021

(54) BLADED JIG FOR FISHING AND METHODS OF MAKING THE SAME

(71) Applicant: Plastic Research and Development Corporation, Ft. Smith, AR (US)

(72) Inventors: Alex Dickerson, Alma, AR (US); Chad Warner, Muldrow, OK (US)

(73) Assignee: PLASTIC RESEARCH AND DEVELOPMENT CORPORATION, Ft. Smith, AR (US)

( * ) Notice: Subject to any disclaimer, the term of this patent is extended or adjusted under 35 U.S.C. 154(b) by 254 days.

(21) Appl. No.: 16/258,336

(22) Filed: Jan. 25, 2019

(51) Int. Cl.
*A01K 85/10* (2006.01)

(52) U.S. Cl.
CPC .................................. *A01K 85/10* (2013.01)

(58) Field of Classification Search
CPC ........ A01K 85/14; A01K 85/10; A01K 85/00; A01K 83/00; A01K 85/18; A01K 85/16
USPC ............. 43/42.15, 42.18, 42.39, 42.5, 42.51, 43/42.52, 42.11, 42.12, 42.13, 42.19
See application file for complete search history.

(56) References Cited

U.S. PATENT DOCUMENTS

| | | | | |
|---|---|---|---|---|
| 1,155,883 A | * | 10/1915 | Burkman | A01K 85/16 43/42.16 |
| 1,961,378 A | * | 6/1934 | Mitchell | A01K 83/06 43/44.8 |
| 2,357,472 A | * | 9/1944 | Jenkins | A01K 85/16 43/42.02 |
| 2,415,742 A | | 2/1947 | Hiltabidel | |
| 2,517,495 A | | 8/1950 | Kneece | |
| 2,594,387 A | | 4/1952 | Breuer | |
| 4,122,624 A | * | 10/1978 | Smith | A01K 85/14 43/42.33 |
| 4,447,981 A | * | 5/1984 | Bauer | A01K 85/10 43/42.21 |
| 4,936,041 A | * | 6/1990 | Couture | A01K 85/14 43/42.15 |
| 4,987,695 A | * | 1/1991 | Preiser | A01K 83/00 43/42.41 |

(Continued)

OTHER PUBLICATIONS https://www.molix.com/en/product/jigs-jig-heads-en/lover-2/; screen shot obtained from the world wide web on Apr. 30, 2019; 1 pg.

(Continued)

*Primary Examiner* — Peter M Poon
*Assistant Examiner* — Kari A Bradberry
(74) *Attorney, Agent, or Firm* — Stephen H. Hall; Jake M. Gipson; Bradley Arant Boult Cummings LLP

(57) ABSTRACT

An improved bladed fishing jig is provided. The bladed jig comprises a hook joined to a wire form. A blade mounting section of the wire extends beyond the hook eye. A metal core is molded around portions of the hook and wire form, and the blade mounting section extends from the metal core. A blade is attached by inserting the blade mounting section of the wire into a mounting through hole near the bottom of the blade. A plastic exterior is molded around the metal core and has a blade slot formed between front and back slot walls. The blade mounting section transverses the blade slot from the front to the back slot wall. The blade is locked on the wire in the blade slot. The blade includes an attachment for a fishing line and oscillates from side to side as the jig is retrieved through the water.

9 Claims, 13 Drawing Sheets

(56) References Cited

U.S. PATENT DOCUMENTS

| | | | |
|---|---|---|---|
| 5,337,508 A * | 8/1994 | Pfeiffer | A01K 85/16 |
| | | | 43/42.03 |
| D425,599 S | 5/2000 | Lummis | |
| D450,368 S | 11/2001 | Lummis | |
| 7,421,820 B2 | 9/2008 | Harrell | |
| 7,621,068 B1 * | 11/2009 | Renosky | A01K 85/01 |
| | | | 43/42.03 |
| 7,627,978 B2 | 12/2009 | Davis | |
| 7,726,062 B2 | 6/2010 | Davis | |
| 7,748,157 B1 | 7/2010 | Hellmann | |
| 8,656,633 B2 | 2/2014 | Renosky | |
| 9,253,967 B2 | 2/2016 | Davis | |
| D769,405 S | 10/2016 | Johnson | |
| D783,768 S | 4/2017 | McGannon | |
| D815,245 S | 4/2018 | Robinson | |
| 10,477,845 B1 * | 11/2019 | Davis | A01K 85/02 |
| 2006/0010764 A1 * | 1/2006 | Frawley | A01K 85/16 |
| | | | 43/42.09 |
| 2006/0201050 A1 * | 9/2006 | Troutman | A01K 85/12 |
| | | | 43/42.19 |
| 2015/0007483 A1 | 1/2015 | Thorne | |
| 2016/0106081 A1 | 4/2016 | Thorne | |
| 2016/0205908 A1 * | 7/2016 | Stanford | A01K 83/00 |
| 2020/0187471 A1 * | 6/2020 | Thorne | A01K 85/10 |

OTHER PUBLICATIONS https://www.strikeking.com/products/tour-grade-rage-blade-bladed-jig; screen shot obtained from the world wide web on Apr. 30, 2019; 1 pg.

https://www.tacklewarehouse.com/Bladed_Swim_Jigs/catpage-CHATTER.html; screen shot obtained from the world wide web on Apr. 30, 2019; 1 pg.

* cited by examiner

BLADED JIG FOR FISHING AND METHODS OF MAKING THE SAME

FIELD OF INVENTION

This disclosure relates to fishing lures and methods of making fishing lures. More particularly, this disclosure relates to fishing lures with blade extending from the lure that is connected to a fishing line by a snap (or other attachment means) and that causes the lure to vibrate as it is pulled through the water.

BACKGROUND

Fishing lures often include various features and components to impart vibration, sound, and flash that may attract fish. These disturbances can provide many benefits, such as allowing predatory fish to detect the fishing lure at a greater distance and triggering otherwise inactive (or non-feeding) fish to strike.

A recent example is the bladed jig. This lure traditionally comprises a weighted jig head with a thin blade secured to a circular eye extending from the front of the jig head. The blade includes an attachment mechanism, such as a snap or split ring, for securing the vibrating jig to an angler's fishing line. When the vibrating jig is retrieved through the water, the blade oscillates from side to side. This oscillation causes the fishing lure to vibrate and to generate some sound as the various components rub or bump together. Depending on the material and finish of the blade, this oscillation may also generate flash. Although such lures have proven effective in certain situations, various challenges and drawbacks remain.

One challenge is that vibrating jigs tend to rise in the water column as they are retrieved. A handful of factors contribute to this characteristic, including that the blade attachment (i.e. the circular eye) is located at the front of the lure. The tendency to rise is problematic when a fisherman wishes to fish a vibrating jig at greater depths or near the bottom. To keep the lure at the targeted depth, the angler must retrieve the vibrating jig at a slower speed. But retrieving the lure at slower speeds reduces the speed, and may even stop, the blade's oscillation. The reduced oscillation deprives the lure of its fish-attracting action.

Another challenge is that vibrating jigs tend to snag easily around certain types of cover. For example, because vibrating jigs typically do not include a weed guard, vibrating jigs are prone to become snagged when fished around wood cover, such as laydowns and bushes. Unlike with aquatic vegetation, an angler cannot "rip" the lure to free it from a snag in wood. Similarly, vibrating jigs may be challenging to fish around rock and other hard cover. Due to the arrangement of the blade and the blade attachment, the lure can easily be pulled into and become wedged in rocks or other cover.

Many designs also fail to produce appreciable amounts of sound. In some cases, the vibrating jig produces almost no sound because the blade oscillates from side to side without striking anything. In other cases, the blade may strike a less substantial structure (such as the circular eye), which may generate only minimal sound.

The connection between the blade and the jig, which serves as the pull point for the lure and for fighting fish, is also a weakness. The blade is typically connected to an eye directly or via a split ring. These structures can be weak, and when fighting a fish (or attempting to retrieve a hung lure), the eye or split ring may be pulled open. Once that occurs, the bait must be replaced.

Existing manufacturing techniques also limit the design of vibrating jigs. The weighted jig heads usually consist of a single hook with a lead head secured around the shank or eye of the hook. If a heavier weight is desired, the size of the lead head must be increased, or if a lighter weight is desired, the size of the lead head must be decreased. As a result, the profile and the weight of the lure vary together even though it may be desirable to maintain the same profile when changing the lure's weight.

A need therefore exists for an improved bladed fishing jig and a method of making an improved bladed fishing jig that can be effectively fished throughout the water column and around many different types of cover. Advantageously, the improved bladed fishing jig will better maintain its depth in the water column, even when retrieved at faster speeds. In addition, the improved bladed fishing jig will be snag resistant around hard cover, such as wood and rocks, and will include a strong connection between the blade and jig. Preferably, the improved bladed fishing jig will also have a configuration that produces detectable sounds and that is available in many different weights without changing the profile of the jig.

SUMMARY OF THE INVENTION

The present disclosure describes an improved bladed fishing jig and methods for making the improved bladed fishing jig. Advantageously, embodiments of the improved bladed fishing jig are configured to reduce the lift generated by lure while simultaneously improving the jig's resistance to snags around wood and rock. Embodiments include a unique, strong connection between the blade and jig that resists breaking while fighting a fish and may also generate a distinct fish-attracting sound. Preferably, embodiments of the improved bladed fishing jig may also allow for varying the weight without changing the profile of the jig. Embodiments of the invention may satisfy one or more, but not necessarily all, of the needs and capabilities discussed throughout this disclosure.

In a first exemplary embodiment, a fishing lure is provided and comprises a head having a blade slot formed between a front slot wall and a back slot wall and a wire transversing the blade slot from the front slot wall to the back slot wall; a hook extending from the rear of the head; and a blade having a mounting through hole, wherein the wire extends through the mounting through hole and secures the blade between the front slot wall and the back slot wall. Preferably, the blade slot and the blade are dimensioned to allow the blade to rotate about the wire by between about 70° and about 90°. More preferably, the wire, the blade, and the blade slot are dimensioned to allow the blade to tilt backward by between about 40° and about 60°.

In a second exemplary embodiment, a fishing lure is provided and comprises a hook having a shank and an eye; a wire form connected to the hook, wherein the wire form comprises a blade mounting section of wire extending beyond the eye; a molded head surrounding a portion of the hook and a portion of the wire form, the molded head having a blade slot formed between a front slot wall and a back slot wall, wherein the blade mounting section of wire transverses the blade slot from the front slot wall to the back slot wall; and a blade having a mounting through hole, wherein the wire extends through the mounting through hole and secures the blade between the front slot wall and the back slot wall. Preferably, the molded head comprises a molded plastic exterior surrounding a molded metal core.

In a third exemplary embodiment, a method of making a fishing lure is provided and comprises the steps of providing a hook having an eye; providing a wire form having a blade mounting section of wire; joining the wire form with the hook such that the blade mounting section extends beyond the eye; providing a blade having a mounting through hole and attaching the blade by inserting the blade mounting section of wire into the mounting through hole; and molding a plastic exterior around a portion of the hook and a portion of the wire form, wherein said plastic exterior has a blade slot formed between a front slot wall and a back slot wall, and wherein the blade mounting section transverses the blade slot from the front slot wall to the back slot wall.

The above summary presents a simplified overview to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

The following drawings are attached to and form a portion of this disclosure.

DEFINITIONS

Figure 1:
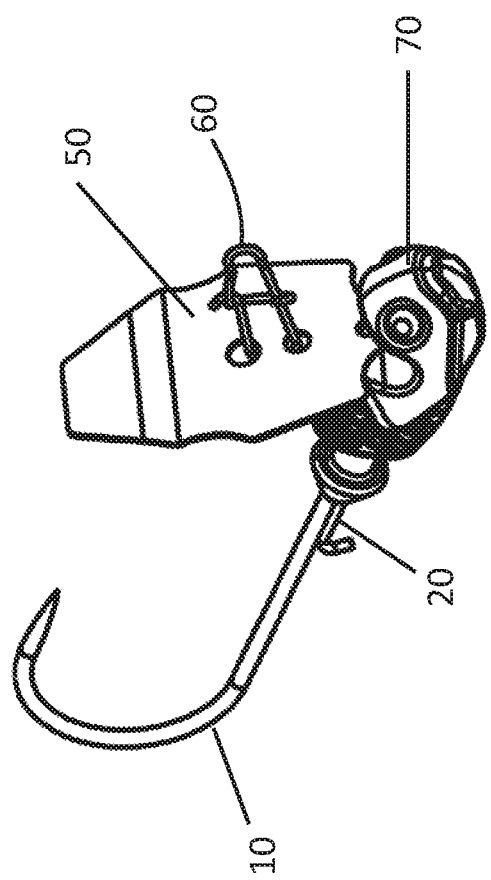
FIG. 1: A perspective view of one embodiment of the improved bladed fishing jig.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. Well known functions or constructions may not be described in detail for brevity or clarity.

The terms "about" and "approximately" shall generally mean an acceptable degree of error or variation for the quantity measured in light of the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a", "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom" or "front" and "back" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed, but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

An improved bladed fishing jig and methods of making an improved bladed fishing jig have been developed and are described. As shown in the drawings, we generally discuss embodiments of the improved bladed fishing jig that have a single, rigidly affixed hook and that are suitable for use with a silicone skirt and a soft plastic trailer, such as a soft plastic craw or a soft plastic swimbait. These specific details, however, are unimportant to the teachings of the disclosure. Variations could be advantageously combined with any existing variations of bladed jigs, such as those with multiple hooks, with non-rigidly affixed hooks, or with features that accommodate different trailers or other ornamentation. In other words, the teachings of this disclosure may be advantageous for use with a fishing lure where it is desirable to connect the lure to an angler's fishing line via a blade that imparts a vibrating action as the lure is retrieved.

An exemplary embodiment of the improved bladed fishing jig is shown in FIGS. 1-17. In this embodiment, the bladed jig comprises a hook 10, a wire form 20, a molded core 30, a molded exterior 40, and a blade 50. In greater detail, the wire form 20 is attached to the hook 10 proximate to the hook's eye 11. The wire form 20 includes a first straight section 21 that extends beyond the eye 11. The metal core 30 is molded around a portion of the hook 10 and a portion of the wire form 20. At least a portion of the first straight section 21 extends outside of the molded core 30. The blade 50 includes a mounting through hole 51 disposed near the base of the blade, and the straight section 21 of wire extends through the mounting through hole 51. The plastic exterior 40 is molded around the metal core 30 and portions of the hook 10 and the wire form 20. The top of the plastic exterior 40 includes a blade slot 41. The first straight section 21 transverses the blade slot 41 and secures the blade 50 between opposite walls 42, 43 of the blade slot 41. One end of a snap 60 may be attached to the blade 50, and a fisherman's fishing line (not shown) may be tied to the opposite end of the snap 60.

Numerous variations of this exemplary embodiment are possible. Each of the components and the many variations are now described in greater detail.

The hook 10 may be any suitable fishing hook. In a preferred embodiment, the hook 10 is a straight shank, single hook and comprises a hook point 12, a hook bend 13, a hook shank 14, and a hook eye 11. In one preferred embodiment, the hook 10 may be a size 5/0 hook with a heavy-gauge wire. In a specific example, the length of the hook shank 14 (measured from the base of the eye 11 to the start of the bend 13) is about 1.5 inches, the gap of the hook (measured from the tip of the hook point 12 to the closest part of the hook shank 14) is about ¾ inches, and the wire diameter is about 0.063 inches. But depending on the intended use of the jig, the hook 10 may be a different size and gauge, or it may be a double hook, a treble hook, or another hook. In some instances, the hook may also be one that is not rigidly affixed in place, meaning that the hook may swivel or rotate relative to the rest of the lure.

The wire form 20 comprises a wire having at least one blade mounting section 21. In a preferred embodiment, the blade mounting section is a straight section of wire, such as the first straight section 21 shown in FIG. 3A. But in other embodiments, the blade mounting section may be curved or bent instead of straight.

Figure 2:
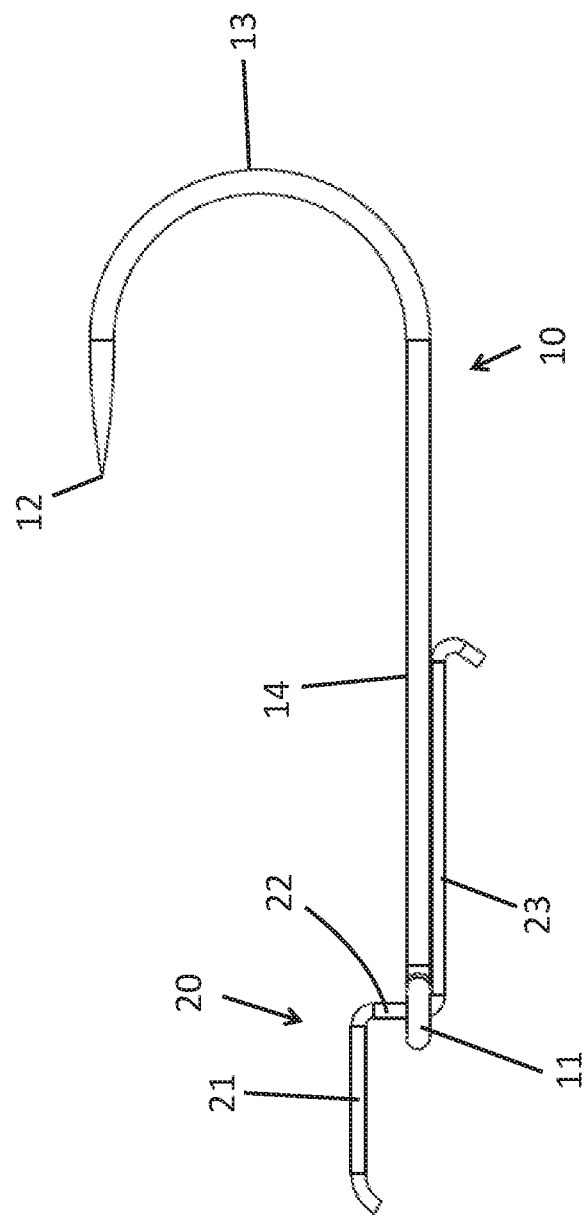
FIG. 2: A side view of the hook and the wire form of one embodiment of the improved bladed fishing jig.
Figure 3B:
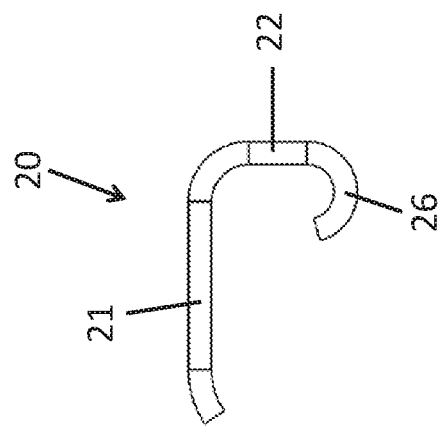
FIG. 3B: A side view of another embodiment of the wire form in an embodiment of the improved bladed fishing jig.
Figure 3A:
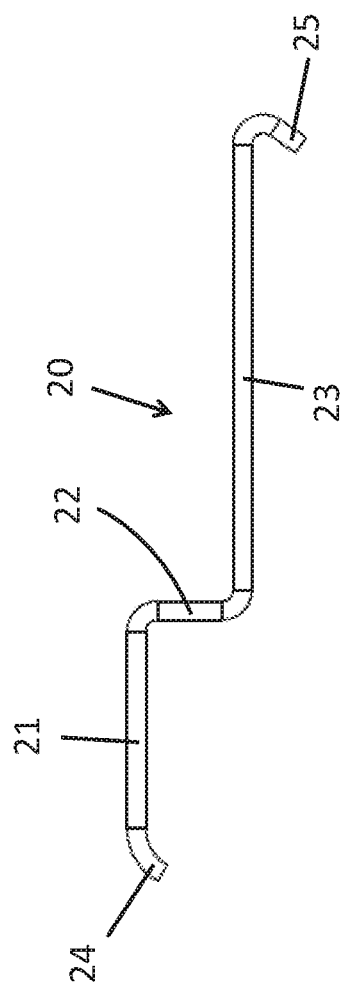
FIG. 3A: A side view of one embodiment of the wire form in an embodiment of the improved bladed fishing jig.

The remainder of the wire form 20 may have various shapes depending on the embodiment. One exemplary shape is shown in FIG. 3A and comprises a first straight section 21, a second straight section 22, and a third straight section 23. The first and third straight sections 21, 23 are parallel to each other and joined by the second straight section 22. The second straight section 22 is perpendicular to the first and third straight sections 21, 23. Preferably, the straight sections 21, 22, 23 may be connected by curves of a slight radius, but the sections may also meet at sharp angles. Advantageously, this design may allow the wire form 20 to mate securely with the hook 10. As shown in FIG. 2, the wire form 20 may be joined with the hook 10 by threading one end of the wire form 20 into the hook eye 11 until the second straight section 22 rests in the hook eye 11. Once at this placement, the third straight section 23 lies parallel with, and preferably adjacent to, the hook shank 14. The first straight section 21 is also parallel to the hook shank 14 but extends beyond the eye 11. Once the metal core 30 is molded, this arrangement allows for a strong connection between the hook 10 and the wire form 20 because the individual components reinforce each other. For example, the hook eye 11 around the second straight section 22 helps to prevent the wire form from sliding up or down along the hook 10, and the third straight section 23 adjacent to the hook shank 14 helps to prevent the wire form 20 from rotating relative to the hook 10.

The dimensions of the wire form 20 typically vary depending on the size of the lure and, in particular, the hook 10. In a preferred embodiment for use with a size 5/0 hook 10, the first straight section 21 is between about ¼ inch and about ½ inch long, and preferably about ⅜ inches long; the second straight section 22 is between about 1/16 inch and about 3/16 inches long, and preferably about ⅛ inch long; and the third straight section 23 is between about ⅝ inches and about 1 inch long, and preferably about 13/16 inches long.

Other embodiments, however, may have wire forms of other shapes. For instance, in some embodiments, the wire form 20 may include a coil of wire or an open loop that wraps around the hook eye 11 or the upper portion of the hook shank 14 (meaning the end of the shank 14 near the eye 11). Or in other embodiments, the wire form 20 may be a straight section of wire lying parallel to the hook shank 14, which optionally may be welded onto the hook 10. Preferably, the design allows for the hook 10 (which may be made from a more resilient wire than the wire form 20) to provide structural support to the wire form 20. The exemplary wire form 20 shown in FIG. 3A is an example of an arrangement that has enhanced structural support. But such support may not be provided in other embodiments. One alternative embodiment of the wire form 20 is shown in FIG. 3B. In this embodiment, the wire form 20 comprises a first straight section 21 and a second straight section 22 that is approximately perpendicular to the first straight section 21. A short third section 26 extends from the opposite end of the second straight section 22. Similar to the previous embodiment, the wire form 20 is joined to the hook 10 such that the second straight section 22 extends through the hook eye 11 and the first straight section 21 extends beyond the hook eye 11 to provide a blade mounting section. The short third section 26 helps to secure the wire form 20 around the hook 10 and provides a larger surface area for securing the wire form 20 inside the molded head 70. As a further alternative, in some embodiments, the hook 10 and wire form 20 are joined together by only the molded head 70 (meaning that the wire form 20 does not pass through the hook eye 11 or otherwise interface with the hook 10).

The wire form 20 may optionally include other features as well. In some embodiments, the wire form 20 includes a downward bent section 24 that extends from the blade mounting section 21. This downward bent section 24 helps to lock the blade 50 in place and is usually outside of the molded core 30. Thus, the blade 50 can be placed around the blade mounting section 21 after the metal core 30 is molded, and then the plastic exterior is molded around the downward bent section 24. The downward bent section 24 reduces the likelihood that that wire form 20 will strip or pull out of the molded exterior 40.

The wire form 20 also preferably includes a bait keeper section 25. As shown, the bait keeper section 25 comprises a short section of wire that extends from the third section of wire 23 at an angle of greater than 90° (meaning that the bait keeper section 25 bends partially back in the direction of the third section of wire 23). Preferably, the bait keeper section 25 extends at a bend between about 105° and about 145°, and more preferably about 125°, from the third straight section 23. After molding, the bait keeper section 25 extends past the molded exterior 40 and is adjacent to the hook shank 14. When a plastic trailer (not shown) is threaded onto the hook shank 14, the bait keeper section 25 protrudes into the plastic trailer and helps keep the trailer in place.

Because the wire form 20 serves as the attachment for the blade 50—and therefore the pull point for the remainder of the lure 13 the wire form 20 must be constructed from a material of sufficient strength to withstand the oscillation of the blade 50 and the forces imparted while fighting a hooked fish. In an exemplary embodiment, the wire form 20 is constructed from stainless steel wire. Preferably, the wire has a diameter between about 0.8 mm and about 1.0 mm, and more preferably, the wire has a diameter of about 0.9 mm (about 0.035 inches). Other metals and gauges of wire may be used, which may vary depending on the intended target species of fish and the intended fishing tackle.

Surrounding a portion of the hook 10 and a portion of the wire form 20 is a molded head 70. In a preferred embodiment, the molded head 70 comprises a molded core 30 and a molded exterior 40. But in other embodiments, the molded head 70 may comprise a single material. For instance, the molded head 70 may be a molded plastic, or it may be a molded metal.

Preferably, the molded core 30 is molded around a portion of the hook 10 and a portion of the wire form 20, and more preferably is molded around the eye 11 and the second straight section 22. The molded core 30 therefore secures the hook 10 and the wire form 20 together. Further, the molded core 30 often provides much of the weight that helps the lure to sink and to maintain its depth as the lure is retrieved. As such, the molded core 30 is preferably molded from a metal and, more preferably, a higher density metal, such as lead or tungsten. In other embodiments, the molded core may be constructed from tin. The size of the molded metal core 30 may be varied to produce lures that have a different weight. In a preferred embodiment, the size of the molded metal core 30 is selected so that the overall weight of the lure (hook 10, wire form 20, molded head 70, and blade 50) is about ½ ounce or about ⅜ ounce.

Figure 4:
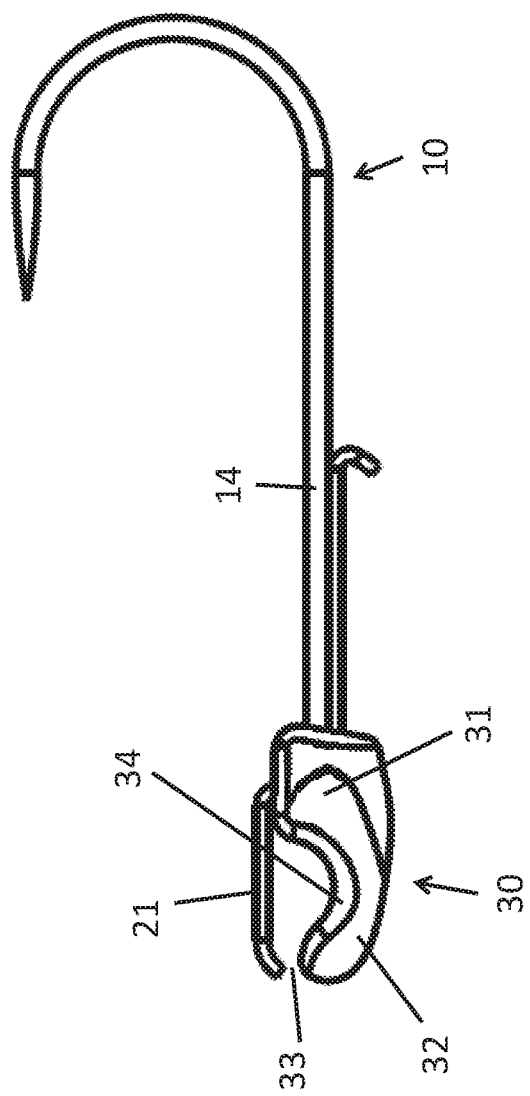
FIG. 4: A side view of a metal core molded around the hook and wire form of one embodiment of the improved bladed fishing jig.
Figure 5:
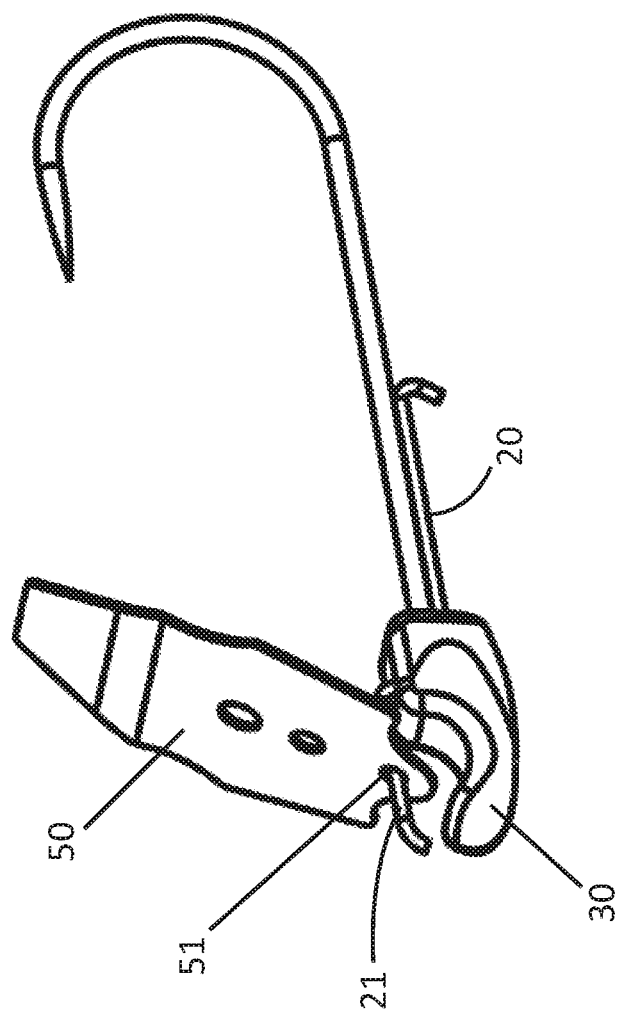
FIG. 5: A perspective view one embodiment of the improved bladed fishing jig without its molded exterior.
Figure 6:
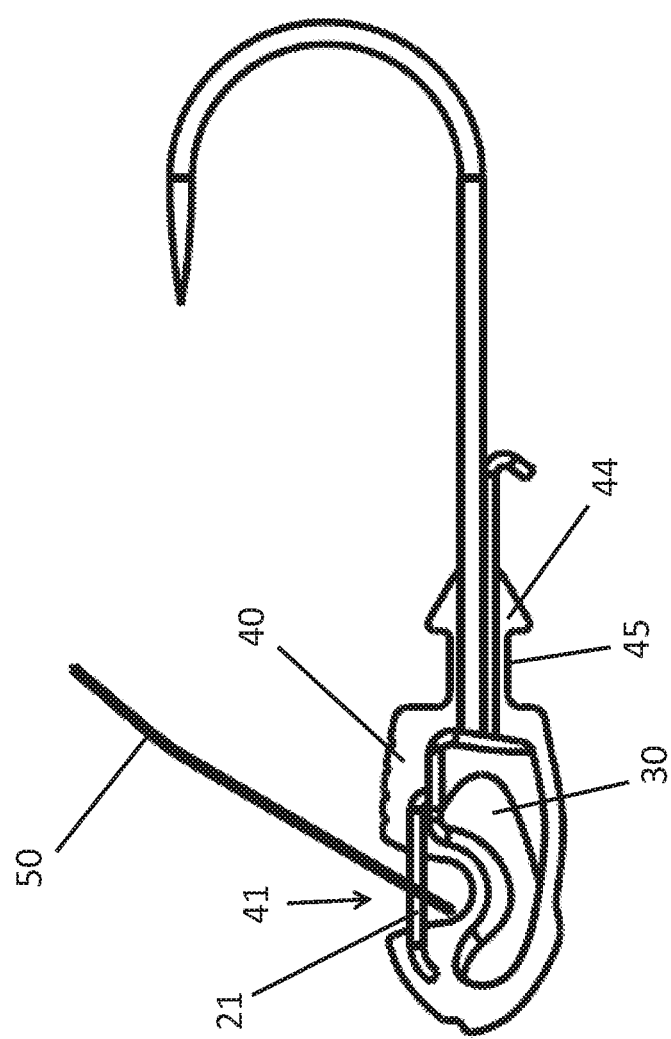
FIG. 6: A side view of one embodiment of the improved bladed fishing jig where the molded exterior is constructed from a clear plastic.

As shown in FIG. 4, one embodiment of the molded core 30 comprises a body 31 and a nose cone 32. The body 31 contains the majority of the core 30 and surrounds the location at which the hook 10 and wire form 20 are joined. In this exemplary embodiment, that location is around the eye 11 and the upper portion of the shank 14. The body 31 thus rigidly affixes the hook 10 to the wire form 20. The body 31, however, preferably does not surround the entirety of the wire form 20, and at least the blade mounting section 21 of the wire extends beyond the front of the body 31. Optionally, a nose cone 32, which consists of an elongated portion of the molded core 30, may also extend beyond the body 31. Preferably, the nose cone 32 is located underneath, and does not touch, the blade mounting section 21. Thus, there is a gap 33 between the front end of the wire form 20 and the front end of the nose cone 32. This gap 33 allows the blade 50 to be added to the blade mounting section 21 after the metal core 30 is molded. As shown in FIGS. 4 and 5, the upper surface 34 of the nose cone 32 may have convex shape. This shape is advantageous because the convex portion helps to accommodate the blade slot 41. The nose cone 32 is also preferably shaped to shift more of the mass forward in the head 70. One of the advantages of the nose cone 32, whether convex or not, is that it spreads the weight of the lure along the horizontal axis of the lure. This feature (along with the location of the pull point discussed below) encourages the lure to be in a more horizontal position and the blade 50 to be tilted slightly backward as the lure is retrieved through the water. This orientation improves the running depth and the snag resistance of the lure.

In an exemplary embodiment where the lure is constructed with a size 5/0 heavy gauge wire hook and the target weight is ½ ounce, the molded metal core 30 has the following dimensions: the body 31 has a length (measured parallel to the axis of the hook shank 14) of about ¼ inch, a height (measured perpendicular to the axis of the hook shank 14) of about ¼ inch, and a width of about ¼ inch; and the nose cone 32 has a length of about ⅜ inches, a height that varies between about ⅛ inch and about 3/16 inches, and a width of about ¼ inch.

In other embodiments, the molded core 30 may have another shape or other dimensions. For instance, in some embodiments, the core 30 may comprise only a body 31 and no nose cone 32.

The molded exterior 40 surrounds the molded core 30 (in embodiments that include a core), a portion of the hook 10, and a portion of the wire form 20. In a preferred embodiment, the molded exterior 40 comprises an exterior head 46 and optionally a throat 45 and a skirt collar 44. The exterior head 46 may be any suitable shape, and is often selected to be hydrodynamic or to mimic the profile of prey. For instance, as shown in FIGS. 11-17, the exterior head 46 may mimic the head of a baitfish, and include features like a jaw line, a scale pattern, and recesses for eyes. But in other embodiments, the head may imitate another type of forage, such as a crawfish or a shrimp. In an exemplary embodiment, the exterior head 46 may have a length of about ⅞ inches, a maximum height of about ½ inch, and a maximum width of about ⁷⁄₁₆ inches. Such dimensions are only exemplary, and the dimensions will vary depending on the size of the vibrating jig, the target species, the intended tackle, and various other factors.

The exterior 40 may be constructed from any suitable material. In a preferred embodiment, the exterior 40 is formed through insert molding (a type of injection molding), so a plastic suitable for injection molding may be used. In some preferred embodiments, the molded exterior comprises a polycarbonate, but in other embodiments, it may comprise another thermoplastic polymer, such as acrylonitrile butadiene styrene, or another plastic polymer. The use of insert molding for the exteriors 40 may be advantageous because the resulting exteriors are stronger, do not include a seam, and are manufactured with fewer steps. But the exteriors 40 may be constructed using other techniques too. In some embodiments, for instance, the exteriors 40 are molded in two halves. The two halves are then secured around the molded core 30, the portion of the hook 10, and the portion of the wire form 20 by using sonic welding, glue, or epoxy.

The exterior head 46 includes a blade slot 41 that extends laterally (perpendicular to the axis of the hook shank 14) across the top. The blade slot 41 is formed between a front slot wall 42, a back slot wall 43, and a slot base 47. The blade mounting section 21 of wire transverses the blade slot 41 from the front slot wall 42 to the back slot wall 43. Thus, the walls of the blade slot 41 form a retainer that prevents the blade 50 from being removed from the blade mounting section 21. Preferably, as discussed in more detail below, the blade slot 41 also restricts the blade's oscillation. The structure of the blade slot 41 and the associated wire form 20 is particularly advantageous because it provides a strong connection between the blade 50 and the rest of the lure. Because an angler's fishing line is secured to the blade, the connection between the blade 50 and the head 70 serves as the pull point for the lure. It therefore must be able to withstand the forces associated with fighting a fish or hanging the lure. This structure achieves that strength because the wire form 20 is molded into the polycarbonate plastic head 40, which resists cracking or breaking and prevents the wire form 20 from being pulled open.

Figure 9:
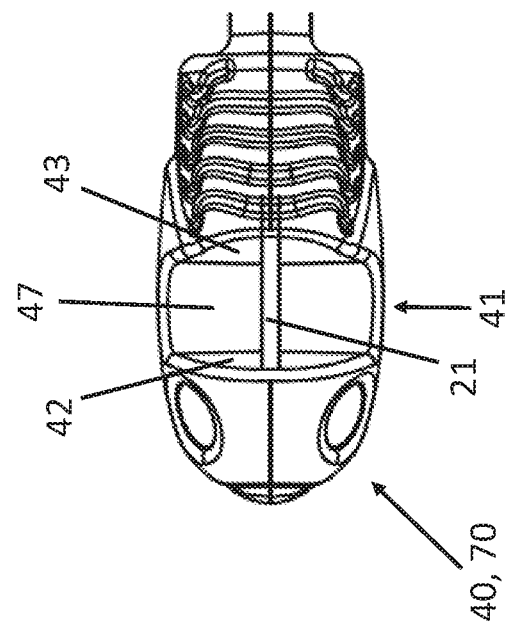
FIG. 9: A top detail view of the blade slot of one embodiment of the improved bladed fishing jig.
Figure 8:
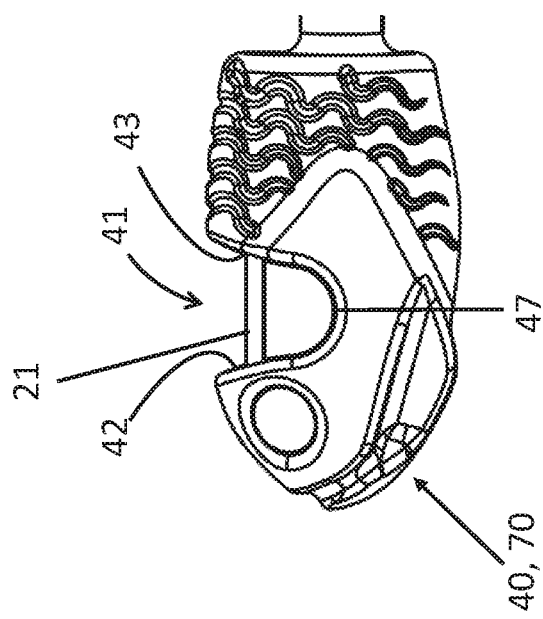
FIG. 8: A side detail view of the blade slot of one embodiment of the improved bladed fishing jig.

In the preferred embodiment shown in FIGS. 8 and 9, the blade slot 41 is formed between slot walls 42, 43 that at least partially slope inward from the top of the slot to the base 47 of the slot. Viewed from the side, the bottom of the blade slot 41 is U-shaped. In more specific detail, an exemplary blade slot 41 has the following dimensions: the blade slot 41 has a length (measured parallel to the axis of the hook shank 14) at the top of slot of about ¼ inch, a length measured along the blade mounting section 21 of about ³⁄₁₆ inches, a depth (measured from the top of the slot to the slot base 47) of about ¼ inch, and a maximum width of about ⁷⁄₁₆ inches.

The blade slot 41 is preferably located near the middle of the exterior head 46. More particularly, in some preferred embodiments, the midpoint of the length of the exterior head 46 is located somewhere along the length of the blade slot 41, but the midpoint of the length of the blade slot 41 is not necessarily the same as the midpoint of the exterior head 46. As a result of this configuration, the pull point for the lure is located near the middle of the exterior head 46 rather than at the front of the exterior head 46. This configuration encourages the lure to have a more horizontal orientation as it is retrieved through the water, which improves the snag resistance and running depth of the lure. The configuration also encourages the blade 50 to be tilted slightly backward as the lure is retrieved, which also improves the snag resistance and running depth. In particular, the front of the head will strike underwater obstructions like sticks or vegetation before the blade, so the lure is less likely to become hung. And when obstructions strike the blade that is tilted slightly backward, the obstructions are deflected up and around the hook. In addition, the backward tilt of the blade (similar to the lip on a crankbait fishing lure) may result in downward force as the lure is pulled through the water, which helps the bait to maintain its depth.

Advantageously, when matched with a suitably dimensioned blade 50, the blade slot 41 restricts the movement of the blade 50. For instance, the depth and width of the blade slot 41 may be selected to limit the rotation of the blade 50 about the blade mounting section 21 of the wire. In other words, these dimensions may be selected so that the blade 50 can rotate (spin clockwise and counter-clockwise) only so far about the blade mounting section 21 until the bottom edge of the blade contacts the slot base 47. Once the blade 50 strikes one side of the base 47, the blade 50 rotates in the other direction and strikes the other side of the base 47. This side to side oscillation occurs rapidly and creates vibration that fish can sense in the water. In addition, because the blade 50 is striking the head, it generates sound that fish detect. Preferably, the blade slot 41 is dimensioned to allow the blade 50 to rotate about the blade mounting section 21 between about 60° and about 100°, more preferably between about 70° and about 90°, and even more preferably about 80°.

In some embodiments, the blade slot 41 may also limit the amount by which the blade 50 can tilt backward (or forward). As used here, a tilt of 0° describes the blade in a position that, when viewed from the side, is perpendicular to the central axis of the blade mounting section 21. Although the amount of possible tilt is typically limited by the diameter of the wire form 20 and the diameter of the mounting through hole 51 (discussed below), the slot walls 42, 43 may be spaced to limit how far the blade can tilt backward before it contacts both of the walls 42, 43. Preferably, the blade 50 can tilt backward by between about 30° and about 70°, more preferably between about 40° and about 60°, and even more preferably about 50°.

Optionally, the molded exterior 40 includes a throat 45 and skirt collar 44. These features are advantageous in embodiments where the bladed jig is intended to include a skirt (not shown). The throat 45 extends from the rear of the exterior head 46 and provides a section of relatively smaller diameter about which to secure the skirt. In an exemplary embodiment, the throat has a length of about ³⁄₁₆ inches and a diameter of about ⁵⁄₃₂ inches. At the base of the throat 45 is a skirt collar 44. The skirt collar 44 is cone shaped, with its widest section abutting the base of the throat 45 and its narrowest section at the end of the exterior head 40. The skirt collar 44 allows for a skit to be slid easily over the cone and onto the throat 45, after which the wide end of the skirt collar 44 prevents the skirt from sliding off the throat 45 and down the hook shank 14. In an exemplary embodiment, the skirt collar 44 has a length of about ⅛ inch and a maximum diameter of about ¼ inch.

The blade 50 is a thin sheet of metal and comprises a lower section 52, a middle section 53, and an upper section 54. In many embodiments, the blade 50 is stamped from a sheet of metal. Suitable metals for the blade 50 include stainless steel or brass, which may be plated with gold, nickel, or black nickel. Preferably, the blade 50 has a thickness between about 0.010 inches and about 0.020 inches, and more preferably a thickness of about 0.015 inches. Although other thicknesses may be used, the blade 50 must be thick enough to withstand the forces associated with oscillation and fighting fish, but if a blade 50 is too thick, it may deaden the action of the lure.

Figure 10:
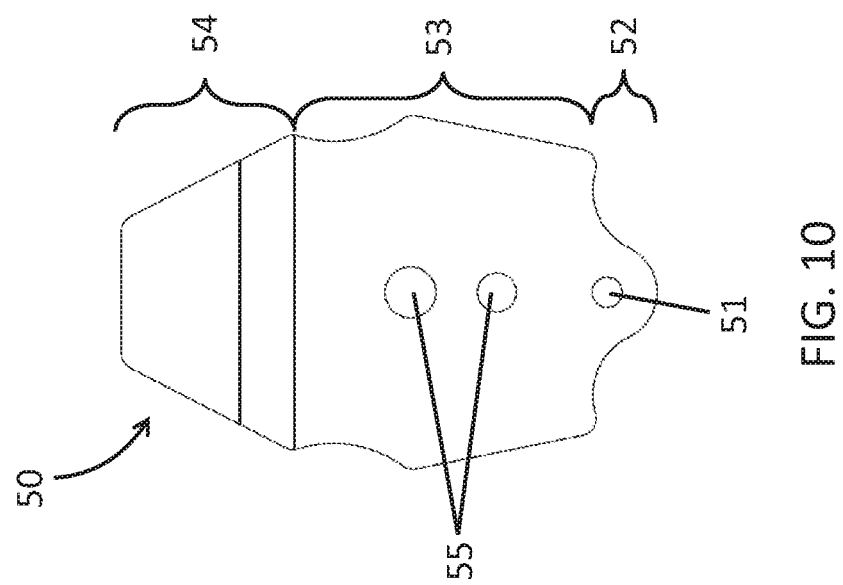
FIG. 10: A front view of the blade in one embodiment of the improved bladed fishing jig.
Figure 12:
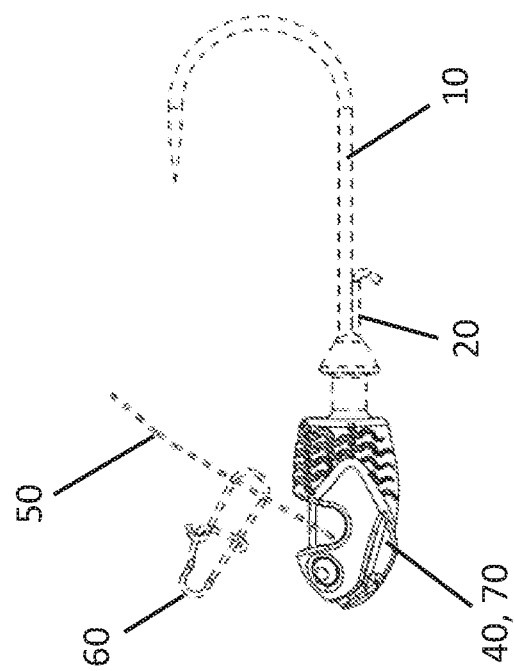
FIG. 12: A side view of one embodiment of the improved bladed fishing jig showing the detail of the exterior head, with the blade, snap, hook, bait keeper, and skirt keeper shown in broken lines.
Figure 11:
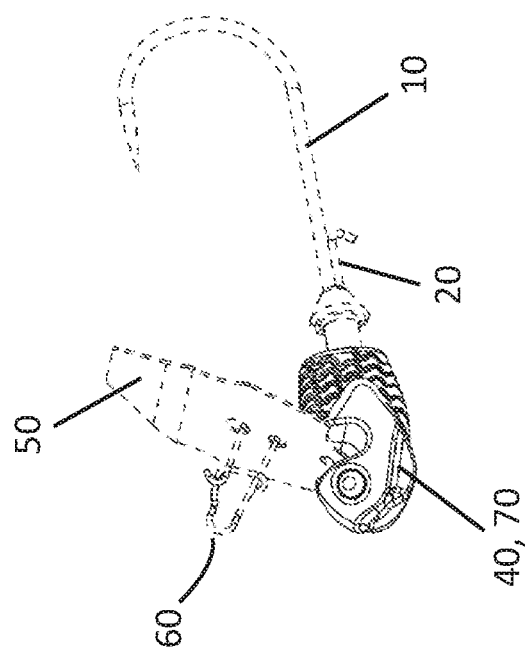
FIG. 11: A perspective view of one embodiment of the improved bladed fishing jig showing the detail of the exterior head, with the blade, snap, hook, bait keeper, and skirt keeper shown in broken lines.
Figure 14:
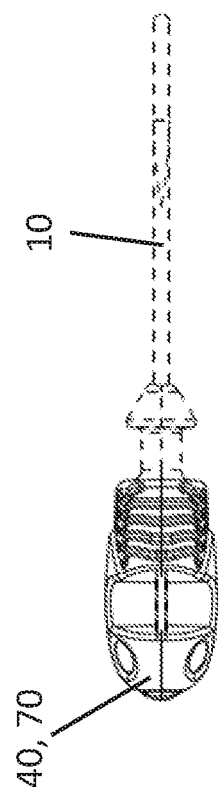
FIG. 14: A top view of one embodiment of the improved bladed fishing jig showing the detail of the exterior head, with the blade and snap removed and the hook, bait keeper, and skirt keeper shown in broken lines.
Figure 13:
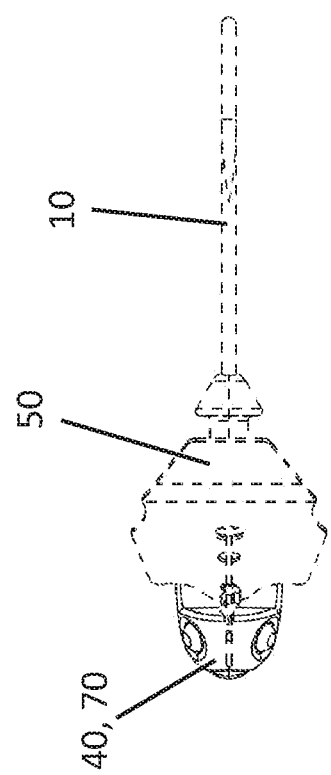
FIG. 13: A top view of one embodiment of the improved bladed fishing jig showing the detail of the exterior head, with the blade, snap, hook, bait keeper, and skirt keeper shown in broken lines.
Figure 16:
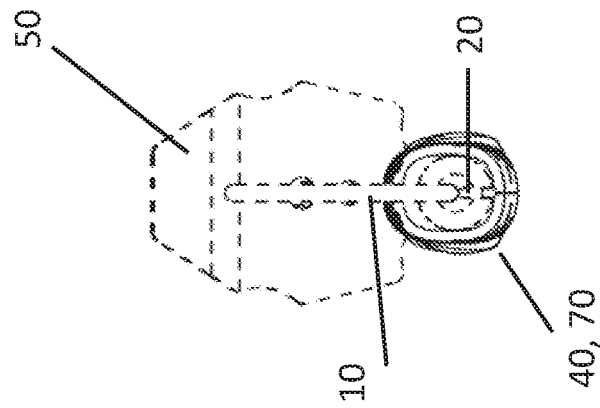
FIG. 16: A rear view of one embodiment of the improved bladed fishing jig showing the detail of the exterior head, with the blade, hook, bait keeper, and skirt keeper shown in broken lines.
Figure 15:
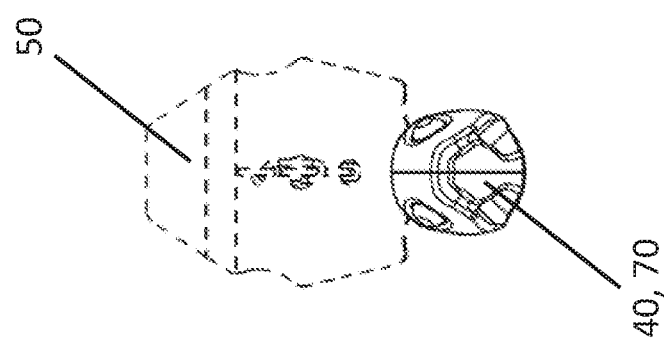
FIG. 15: A front view of one embodiment of the improved bladed fishing jig showing the detail of the exterior head, with the blade and snap shown in broken lines.
Figure 17:
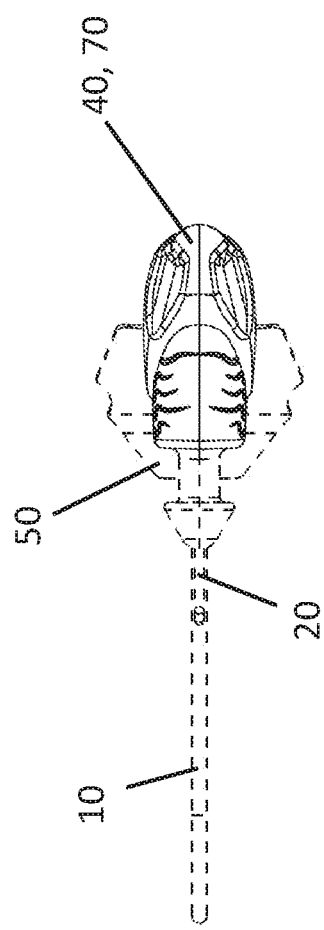
FIG. 17: A bottom view of one embodiment of the improved bladed fishing jig showing the detail of the exterior head, with the blade, hook, bait keeper, and skirt keeper shown in broken lines.

The lower section 52 extends downward from the middle section 53 and contains at least a portion of the mounting through hole 51. In a preferred embodiment, the lower section 52 is substantially narrower in width than the middle section 53. For instance, the maximum width of the lower section 52 may be no more than two thirds, and more preferably no more than one half, of the width at the bottom of the middle section 53. For instance, in an exemplary embodiment, the bottom of the middle section 53 has a width of about ⅝ inches and the lower section 52 has a maximum width of about ⁵⁄₁₆ inches. Preferably, the lower section 52 also narrows in width as it extends downward from the middle section 53. For instance, the sides of the lower section 52 may have a concave curve and the bottom of the lower section 52 may be a rounded curve (as shown in FIG. 10). In other embodiments, the sides may be curved or sloped inward as they extend down. The narrower width of the lower section 52 and the downward taper allow the blade 50 a greater degree of rotation about the blade mounting section 21 until the bottom of the middle section 53 or the sides of the lower section 52 contact the blade slot 41. In a preferred embodiment, the dimensions of the lower section 52 and the dimensions of the blade slot 41 are selected to achieve the desired degree of rotation mentioned above. The lower section 52 may have a total height of about ³⁄₁₆ inches.

The mounting through hole 51 is located at least partially in the lower section 52 and attaches the blade 50 to the blade mounting section 21 of wire. Preferably, the mounting through hole 51 is centered on the vertical center line of the blade 50 so that the blade 50 uniformly oscillates in both directions as it is pulled through the water. The diameter of the mounting through hole 51 is preferably selected to allow a certain amount of play in the blade 50 when attached to a wire 20 of a specific diameter. Importantly, the diameter of the mounting through hole 51 and the diameter of the wire 20 may be selected to limit how far the blade 50 can tilt backward, which may be within one of the preferred ranges discussed above. In an exemplary embodiment with a wire having a diameter of about 0.035 inches, the mounting through hole 51 has a diameter of about ¹⁄₁₆ inches (0.063 inches).

The amount of backward tilt may also be selected to improve the weedlessness of the lure. In these embodiments, the blade 50 functions similar to a weed guard. To do so, the blade must extend far enough upward so that it extends at least as high as the hook point 12. The blade 50 can then deflect sticks, vegetation, and other objects before they reach the hook point 12. The amount of backward tilt (as well as the height of the blade 50) may therefore be selected to ensure that the top of the blade 50 is generally higher than the hook point 12 even when the blade is tilted fully backward. This calculation must also be made with reference to the gap of the hook 10. In an exemplary embodiment where the hook 10 has a gap of about ¾ inches and the blade 50 has a height of about 1¼ inches, the blade can preferably tilt backward by no more than about 50°.

The middle section 53 comprises the majority of the blade and includes means to attach the lure to a fishing line. In many embodiments, the means to attach include a second and third through hole 55, into which a snap or split ring may be inserted. But in other embodiments, the means to attach may be another structure such as a single wire extending from or affixed to the blade 50. Alternatively, in some embodiments, the middle section 53 may include at least three through holes for attaching, and the user may selectively use two of the holes at any given time. By varying which holes are used for attachment, a user can thereby change the action of the blade.

The middle section 53 may have any suitable shape, which may be varied to impart different action on the lure. In an exemplary embodiment, the middle section 53 may comprise an essentially four-edged polygon—a bottom edge that meets the lower section 52, two side edges, and a top edge that meets the upper section 52—such as that shown in FIG. 10. The two side edges extend upward and outward from the bottom edge, such that the middle section 53 increases in width for at least part of the distance from bottom to top. The two side edges, although initially straight, may be rounded or curved as they near the top edge. As shown in FIG. 10, an exemplary embodiment has side edges that are concave near the top of the middle section 53. As a result, the top portion of the middle section 53 may actually decrease in width. More particularly, an exemplary embodiment may have the following dimensions in the middle section 53: a width at the bottom of about ⅝ inches, a maximum width of about ¹³⁄₁₆ inches, a width at the top of about ¾ inches, and a height of about ¹¹⁄₁₆ inches.

The upper section 54 extends from the top edge of the middle section 53. Preferably, the upper section 54 is angled slightly backwards relative to the middle section 53. In an exemplary embodiment, the upper section 54 is angled backward at an angle between about 5° and 20°, and more preferably between about 10° and about 12°. Advantageously, the bend in the upper section 54 increases the thump associated with the blade's oscillation and may also affect the depth at which the lure runs on a steady retrieve.

Any suitable shape may be used for the upper section 54. Preferably, the upper section 54 narrows from bottom (where the upper section 54 meets the middle section 53) to top. As shown in FIG. 10, the upper section 54 may comprise two straight side edges that slope inwardly and upwardly until reaching a straight top edge. In an exemplary embodiment, the upper section 54 may have the following dimensions: a width at the bottom of about ¾ inches, a width at the top of about ⁵⁄₁₆ inches, and a height of about ⅜ inches.

Figure 7:
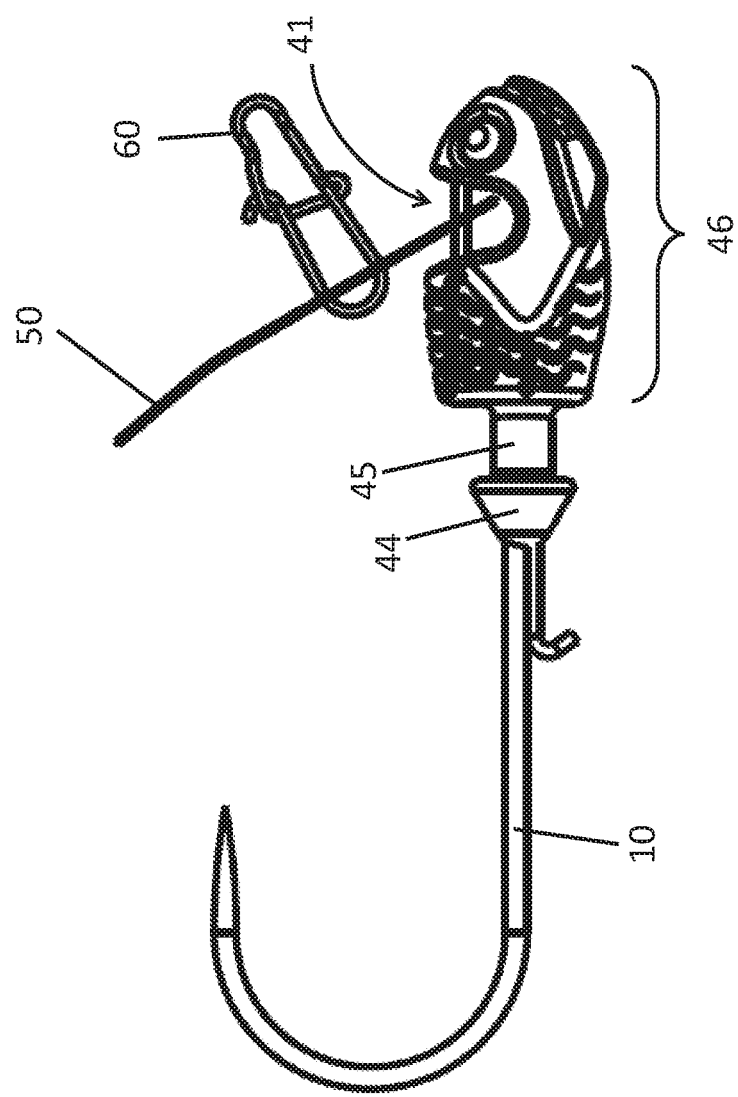
FIG. 7: A side view of one embodiment of the improved bladed fishing jig with a snap attached to the blade.

Some embodiments may optionally include a snap 60, split ring, swivel, or other connection hardware attached to the blade 50. In those embodiments, the blade 50 may include a pair of through holes 55 into which the snap 60 or split ring may be inserted. In some cases, one of the pair of through holes 55 may be larger to ease the process of securing the snap 60 on the blade 50. Any suitable connection hardware may be used, and an exemplary snap 60 is depicted in FIG. 7.

Embodiments of the vibrating jig discussed above may be manufactured using various techniques. The following steps comprise an exemplary embodiment for making an improved vibrating jig. It should be understood that the following steps are merely exemplary, some of which may be modified, omitted, or reordered to produce embodiments of the vibrating jig.

In a first step, a hook 10 and a wire form 20 are provided. In some cases, the wire form 20 may be pre-formed, but in other cases, a raw section of wire may be provided for forming the wire form 20. In an exemplary embodiment, a straight section of wire is provided and then bent into a shape that comprises a first straight section 21, a second straight section 22, and a third straight section 23.

In a next step, the hook 10 and the wire form 20 are joined together. In a method involving assembly of the specific preferred embodiment discussed above, this step may comprise inserting an end of the wire form 20 into the hook eye 11 and threading the wire form 20 into the eye 11 until the second straight section 22 rests in the hook eye 11. More generally, this step is completed by manipulating the wire form 20 to secure any features, such as a coil or loop, with the hook shank 14 and hook eye 11.

The next step may comprise molding the metal core 30 around a portion of the hook 10 and a portion of the wire form 20. In an exemplary embodiment, the joined hook 10 and wire form 20 are placed in a mold that includes features to secure the hook 10 and the wire form 20 in a specific location and orientation. A molten metal is then poured into the mold and allowed to cool. Once solidified and removed from the mold, the molded core 30 secures the hook 10 to the wire form 20. Optionally, this step may include a step for finishing the molded core 30, such as sanding or grinding any rough edges off of the core 30.

After molding the metal core 30, the next step may comprise attaching a blade 50 to the blade mounting section 21 of wire protruding from the molded core 30. In some embodiments, this step may include or be preceded by a process for making the blade 50. That process may include stamping the blade 50 from a suitable sheet of metal, applying any desired finishes (such as gold or nickel plating), and bending the blade 50 between the upper and middle sections 53, 54 to a desired angle, such as 10° to 12°. The blade 50 can then be attached by inserting the blade mounting section 21 into the mounting through hole 51.

Once the blade 50 is attached, the molded exterior 40 may be added in the next step. In an exemplary step, an insert molding process (or another type of injection molding) is used. To do so, the incomplete lure (hook 10, wire form 20, molded core 30 and blade 50) are placed in a mold. The mold preferably includes features that secure and hold the various components in a specific location and orientation during molding. The mold may then be inserted into a molding machine, and the machine is operated to inject a molten plastic or resin into the mold. The plastic is allowed to cool or solidify, at which point the molded exterior 40 and the remainder of the lure may be removed from the mold. Once molded, the plastic of the exterior 40 surrounds both ends of the blade mounting section 21, which locks the blade 50 in place. Alternatively, other molding techniques may be used. In some embodiments, the molded exterior 40 may be molded in two separate halves without the presence of the other components. After the halves are molded, they may be secured around the molded core 30, such as by gluing, epoxying, or sonic welding the two halves together.

In some embodiments, the steps for making the vibrating jig may not include both molding the metal core 30 and molding the plastic exterior 40. Instead, the steps may include only one or the other step—that is, either molding a metal-only head or molding a plastic-only head around the hook 10 and the wire form 20.

After molding the plastic exterior 40, the process may include various optional finishing steps. For instance, some embodiments may include a step for sanding or shaping the plastic exterior head 40. Embodiments may also include a painting or ornamentation step where various paint, glitter, and protective epoxies are applied to the plastic exterior 40. This ornamentation step may also include application of finishing features like stick on eyes or other details applied by adhesive or glue, or adding one or more skirts around the throat 45.

Some embodiments may also include a step for adding a fastener like a snap 60 to the blade 50. An example of this step includes opening the snap 60, inserting an end of the snap into the first of the pair through holes 55 and then back through the second of the pair of through holes 55. The snap 60 may then be closed. To use the lure, an angler can then tie his fishing line to the other end of the snap 60.

While the foregoing specification has described specific embodiments of this invention and many details have been put forth for the purpose of illustration, it will be apparent to those skilled in the art that the invention is susceptible to additional embodiments and that certain of the details described herein can be varied considerably without departing from the basic principles of the invention.

We claim:

1. A fishing lure comprising:
   a hook having a shank and an eye;
   a wire form directly connected to said hook, wherein said wire form comprises a blade mounting section of wire extending beyond said eye, and wherein said wire form extends through said eye;
   a molded head surrounding a portion of said wire form, said molded head having a blade slot formed between a front slot wall and a back slot wall, wherein said hook extends from the rear of said molded head and said blade slot extends across the top of said molded head, and wherein said blade mounting section of wire transverses said blade slot from said front slot wall to said back slot wall; and
   a blade having a mounting through hole, wherein said wire extends through said mounting through hole and secures said blade between said front slot wall and said back slot wall.

2. The fishing lure of claim 1, wherein said blade has a second and third through hole configured for attaching said blade to a fishing line.

3. The fishing lure of claim 1, wherein said molded head surrounds a portion of said hook and said wire form is rigidly affixed to said shank by said molded head.

4. The fishing lure of claim 3, wherein said blade mounting section of wire is a straight section of wire.

5. The fishing lure of claim 4, wherein said wire form further comprises a second straight section of wire perpendicular to said blade mounting section of wire and a third straight section of wire parallel to said blade mounting section of wire, said second straight section of wire between said first and third straight sections of wire, wherein said second straight section of wire extends through the eye and said third straight section is parallel to said shank.

6. The fishing lure of claim 5, wherein said wire form further comprises a bait keeper section extending at an obtuse angle from said third straight section of wire.

7. The fishing lure of claim 1, wherein said molded head comprises a molded plastic exterior surrounding a molded metal core.

8. The fishing lure of claim 7, wherein said molded metal core comprises a body and a nose cone, wherein said blade mounting section of wire extends from said body and said nose cone extends from said body underneath said blade mounting section.

9. The fishing lure of claim 7, wherein said molded plastic exterior comprises a polycarbonate.

* * * * *